United States Patent
Chatterjee et al.

(10) Patent No.: US 12,045,471 B2
(45) Date of Patent: Jul. 23, 2024

(54) SECURE MEMORY ISOLATION FOR SECURE ENDPOINTS

(71) Applicant: International Business Machines Corporation, Armonk, NY (US)

(72) Inventors: Debapriya Chatterjee, Austin, TX (US); Guerney D. H. Hunt, Yorktown Heights, NY (US); Eric Norman Lais, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 17/443,465

(22) Filed: Jul. 27, 2021

(65) Prior Publication Data
US 2023/0040900 A1 Feb. 9, 2023

(51) Int. Cl.
*G06F 3/06* (2006.01)
*G06F 13/28* (2006.01)

(52) U.S. Cl.
CPC .............. *G06F 3/062* (2013.01); *G06F 3/061* (2013.01); *G06F 3/0655* (2013.01); *G06F 3/0679* (2013.01); *G06F 13/28* (2013.01); *G06F 2213/28* (2013.01)

(58) Field of Classification Search
CPC ........ G06F 3/0622; G06F 3/062; G06F 3/061; G06F 3/0679; G06F 13/28; G06F 2213/28
See application file for complete search history.

(56) References Cited

U.S. PATENT DOCUMENTS

| 9,760,512 B1 | 9/2017 | Arroyo |
| 10,176,122 B2 | 1/2019 | Kaplan |
| 10,296,741 B2 | 5/2019 | Hall |

(Continued)

FOREIGN PATENT DOCUMENTS

| CN | 110609799 A | 12/2019 |
| TW | 201833775 A | 9/2018 |

(Continued)

OTHER PUBLICATIONS

"Patent Cooperation Treaty PCT Notification of Transmittal of The International Search Report and The Written Opinion of The International Search Authority, or The Declaration", International application No. PCT/EP2022/068206, International filing date Jun. 30, 2022, Date of mailing Oct. 27, 2022, 11 pages.

(Continued)

*Primary Examiner* — Ernest Unelus
(74) *Attorney, Agent, or Firm* — Stephen R. Yoder (57) ABSTRACT

A single input/output (I/O) controller for both secure partitionable endpoints (PEs) and non-secure PEs is enabled in a trusted execution environment (TEE) where secure memory portions are isolated from non-secure PEs. Security attributes for certain endpoints indicate secure memory access privilege of owning entities of the certain endpoints. A security monitor has exclusive access to the address translation control tables (TCE) stored in secure memory associated with a secure endpoint. When owning entity reassignment occurs, the endpoints are reinitialized to support a change in ownership from an outgoing owning entity having secure memory access and an incoming owning entity not having secure memory access.

20 Claims, 5 Drawing Sheets

(56) References Cited

U.S. PATENT DOCUMENTS

| | | | |
|---|---|---|---|
| 10,387,686 | B2 | 8/2019 | Boivie |
| 10,601,596 | B2 | 3/2020 | Costa |
| 10,838,877 | B2 | 11/2020 | Parker |
| 11,314,658 | B2 | 4/2022 | Parker |
| 2018/0107608 | A1* | 4/2018 | Kaplan ............... G06F 12/1466 |
| 2018/0121125 | A1* | 5/2018 | Zeng .................... G06F 3/0622 |
| 2018/0267726 | A1 | 9/2018 | Sun |
| 2019/0034627 | A1 | 1/2019 | Hall |
| 2019/0034666 | A1 | 1/2019 | Boivie |
| 2020/0372188 | A1* | 11/2020 | Basak .................... G06F 21/79 |
| 2020/0393977 | A1* | 12/2020 | Alexandrovich ..... G06F 3/0622 |

FOREIGN PATENT DOCUMENTS

| | | |
|---|---|---|
| TW | I710898 B | 11/2020 |
| TW | I714582 B | 1/2021 |

OTHER PUBLICATIONS

"Genode—An Exploration of ARM TrustZone Technology", © 2021 Genode Labs, 14 pages.

"Helping Secure the Cloud with AMD EPYC™ Secure Encrypted Virtualization", AMD Datacenter Solutions, Apr. 2019, © 2019 Advanced Micro Devices, Inc., 2 pages.

"Intel® Software Guard Extensions (Intel® SGX)", © Intel Corporation, printed on Feb. 15, 2021, 6 pages.

"OpenPower Foundation | OpenPower IO Design Architecture (IODA) Version 2 WG Specification", May 8, 2020, 1 page.

"Power ISA™ Version 3.1", IBM, May 1, 2020, © Copyright International Business Machines Corporation 1994-2020, 1538 pages.

"Secure External Memory Controller", Microsemi, © 2014 Microsemi Corporation, 2 pages.

Boivie et al., "SecureBlue++ CPU Support for Secure Execution", 2nd Annual NSA Trusted Computing Conference & Exposition, Sep. 21, 2011, 27 pages.

Disclosed Anonymously, "Cognitive Storage Subsystem Secure Volumes", An IP.com Prior Art Database Technical Disclosure, IP.com No. IPCOM000253178D, IP.com Electronic Publication Date: Mar. 12, 2018, 4 pages.

Disclosed Anonymously, "Method for Secure Data Erasure in DRAM", An IP.com Prior Art Database Technical Disclosure, IP.com No. IPCOM000222405D, IP.com Electronic Publication Date: Oct. 2, 2012, 3 pages.

Disclosed Anonymously, "Method to support TrustZone-M in FreeRTOS", An IP.com Prior Art Database Technical Disclosure, IP.com No. IPCOM000258757D, IP.com Electronic Publication Date: Jun. 12, 2019, 10 pages.

Hunt et al., "Protected Execution Facility: Secure computing for Linux on OpenPower", IBM Research/ Aug. 28, 2018 / © 2018 IBM Corporation, OpenPower™ Summit NA 2019, Aug. 19-20, San Diego, 44 pages.

Hunt et al., "Supporting protected computing on IBM Power Architecture", IBM Developer, Published Mar. 22, 2018, 8 pages.

Intel, "Intel® Architecture Memory Encryption Technologies Specification", Ref: #336907-002US, Rev: 1.2, Apr. 2019, 30 pages.

Lentz et al., "SeCloak: ARM Trustzone-based Mobile Peripheral Control", MobiSys '18, Jun. 10-15, 2018, Munich, Germany, ACM ISBN 978-1-4503-5720-3/18/06, arXiv:2001.08840v1 [cs.CR], Jan. 23, 2020, 13 pages.

Vahldiek-Oberwagner et al., "ERIM: Secure, Efficient in-process Isolation with Memory Protection Keys", Max Planck Institute for Software Systems, printed on Feb. 15, 2021, 56 pages.

\* cited by examiner

SECURE MEMORY ISOLATION FOR SECURE ENDPOINTS

BACKGROUND

The present invention relates generally to the field of in-memory computing architecture, and more particularly to I/O devices in a trusted execution environment (TEE).

In computing, input/output (I/O) is the communication between a computing system and the outside world, including another computing system. Inputs are the signals and/or data received by a computing system and outputs are the signals and/or data sent from the computing system. I/O devices are the pieces of hardware used to communicate with a computing system. For example, a keyboard or computer mouse is an input device for a computer, while monitors and printers are output devices for a computer. Devices for communication between computers, such as modems and network cards, typically perform both input and output operations.

The method used to transfer information between internal storage of a computing system and external input/output (I/O) devices is known as an I/O interface. The processor is interfaced using special communication links by the peripherals connected to any computing system. These communication links adhere to various bus protocol standards. Common examples of I/O bus standards include: (i) peripheral component interconnect express (PCI-e); and (ii) universal serial bus (USB). Typically, bus controllers are controlled by memory mapped I/O (MMIO) interfaces. They perform data transfer by direct memory access (DMA) to the main memory of the processor, which allow the device to read/write data from assigned regions of main memory.

Many hardware systems use DMA, which allows certain hardware sub-systems to access main system memory independent of the central processing unit (CPU). Example hardware systems include disk drive controllers, graphics cards, network cards, and sound cards. DMA is also used for intra-chip data transfer in multi-core processors. Computers that have DMA channels can transfer data to and from I/O devices with much less CPU overhead than computers without DMA channels.

A trusted execution environment (TEE), in contrast to a rich execution environment (REE), is a secure, or trusted, area inside a main processor. The VM-based TEE runs in parallel to the untrusted hypervisor, other VM-based TEEs, and other untrusted VMs. Use of the TEE guarantees that the code and data loaded in the TEE are protected from non-secure access with respect to confidentiality and integrity. A TEE can specify that part of their memory is accessible to the untrusted OS.

The term "secure memory" as used herein refers to a hardware enforcement mechanism to separate the memory associated with a TEE from memory associated with other TEEs or non-secure processes in the system. The enforcement mechanism may include, but does not necessarily include, cryptographic protection.

SUMMARY

In one aspect of the present invention, a method, a computer program product, and a system for isolating secure memory from general access where a single I/O controller is used for I/O devices assigned to both secure and non-secure VMs. This process includes: establishing address translation for a set of secure devices at the I/O memory management unit for access to a secure memory portion of a computing system; storing translation control tables for the set of secure I/O devices in the secure memory portion; determining a security level of an incoming owning entity of a first I/O device of the set of secure I/O devices during ownership reassignment; and reconfiguring the first I/O device according to the determined security level.

In another aspect of the present invention, a method, a computer program product, and a system includes: receiving a direct memory access (DMA) request from the first I/O device; determining the TCE table entry for a first address provided by the first I/O device is in secure memory; translating the first address to a system address; and responsive to the system address residing in secure memory and the first I/O device being marked secure in the hardware table, performing the requested DMA access.

In yet another aspect of the present invention, a method, a computer program product, and a system includes: configuring a base address register to only allow a security monitor to set secure attributes of partitionable endpoints connected to an I/O controller; recording to a hardware table a first security attribute of a set of secure partitionable endpoints connected to the I/O controller, the set of secure partitionable endpoints being owned by entities having access to secure memory; recording to the hardware table a second security attribute of a set of non-secure partitionable endpoints connected to the I/O controller, the set of non-secure partitionable endpoints being owned by entities not having access to the secure memory; storing a first set of translation control tables for the set of secure partitionable endpoints in the secure memory; storing a second set of translation control tables for the set of non-secure partitionable endpoints in non-secure memory; determining a security level of an incoming owner of a first partitionable endpoint of the set of secure partitionable endpoints during ownership reassignment; and reconfiguring the first partitionable endpoint according to the determined security level.

DETAILED DESCRIPTION

A single input/output (I/O) controller for both secure partitionable endpoints (PEs) and non-secure PEs is enabled in a trusted execution environment (TEE) where secure memory portions are isolated from non-secure PEs. Security attributes for certain endpoints indicate secure memory access privilege of owning entities of the certain endpoints. A security monitor has exclusive access to the address translation control tables (TCE) stored in secure memory associated with a secure endpoint. When owning entity reassignment occurs, the endpoints are reinitialized to support a change in ownership from an outgoing owning entity having secure memory access and an incoming owning entity not having secure memory access. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, a functional programming language such as SML, LISP, or Haskell, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
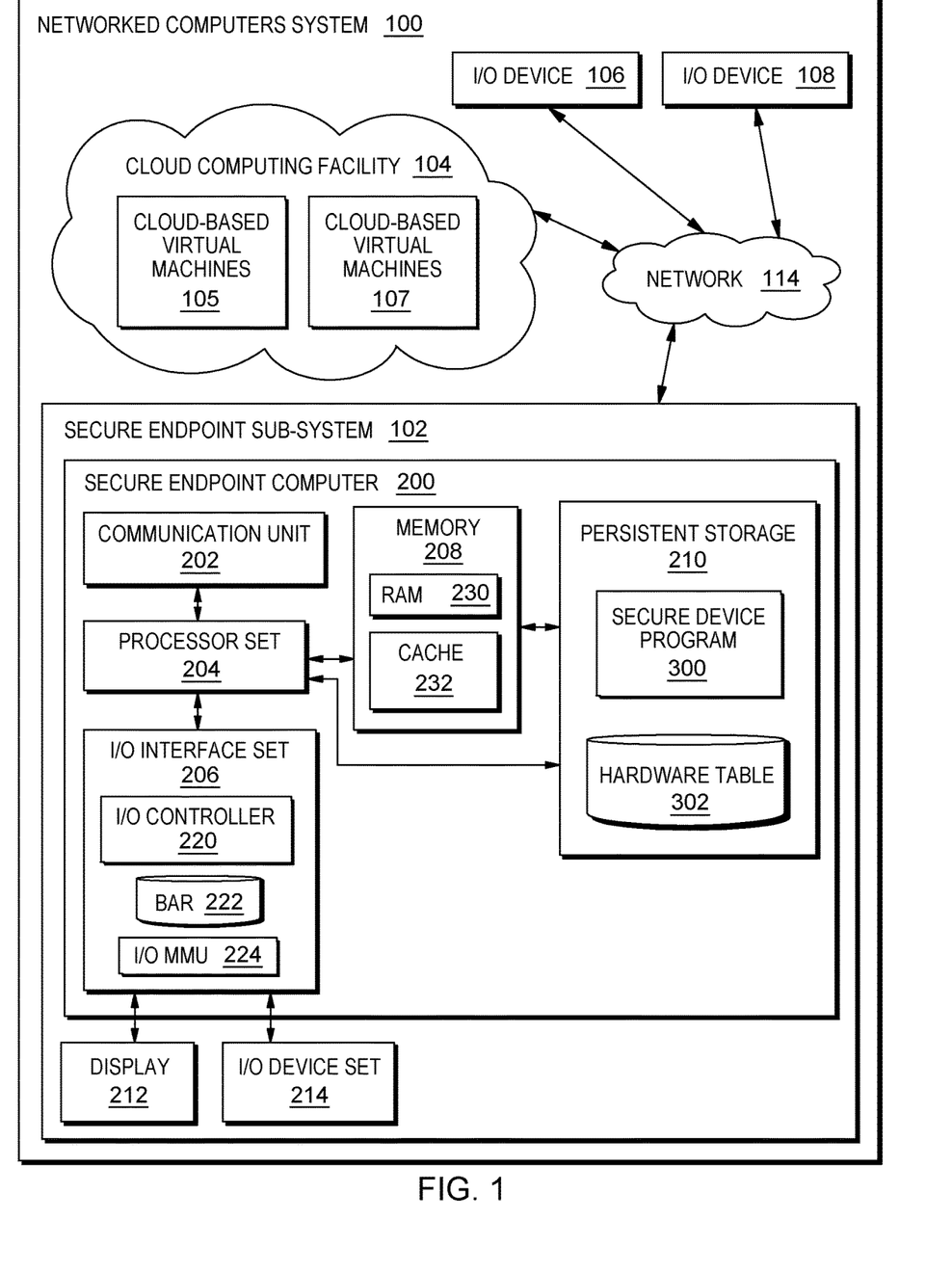
FIG. 1 is a schematic view of a first embodiment of a system according to the present invention.

The present invention will now be described in detail with reference to the Figures. FIG. 1 is a functional block diagram illustrating various portions of networked computers system 100, in accordance with one embodiment of the present invention, including: secure endpoint sub-system 102; cloud computing facility 104; cloud-based virtual machines 105, 107; input/output (I/O) device sub-systems 106, 108; communication network 114; secure device computer 200; communication unit 202; processor set 204; I/O interface set 206; memory device 208; persistent storage device 210; display device 212; I/O device set 214; I/O controller 220; base address register (BAR) 222; I/O memory management unit (MMU) 224; random access memory (RAM) devices 230; cache memory device 232; secure device program 300; and hardware table 302.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) I/O device set 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to I/O device set 214. The I/O device set will typically include devices such as a keyboard, keypad, a touch screen, virtual machines, and/or some other suitable input device. I/O device set 214 can also include portable computer readable storage media such as, for example, thumb drives, portable optical or magnetic disks, and memory cards. Software and data used to practice embodiments of the present invention, for example, program 300, can be stored on such portable computer readable storage media. I/O devices, such as a GPU, may be owned by entities having access to secure memory locations and/or entities restricted from access to secure memory locations. Ownership of I/O devices may be reassigned such that the incoming owner has different memory access privileges than the outgoing owner. The I/O interface set includes input/output (I/O) controller 220, base address register (BAR) 222, and I/O memory management unit (MMU) 224. In these embodiments the relevant software may (or may not) be loaded, in whole or in part, onto persistent storage device 210 via the I/O controller. I/O interface set 206 also operates to connect data communication with display device 212.

Display device 212 provides a mechanism to display data to a user and may be, for example, a computer monitor, or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Figure 3:
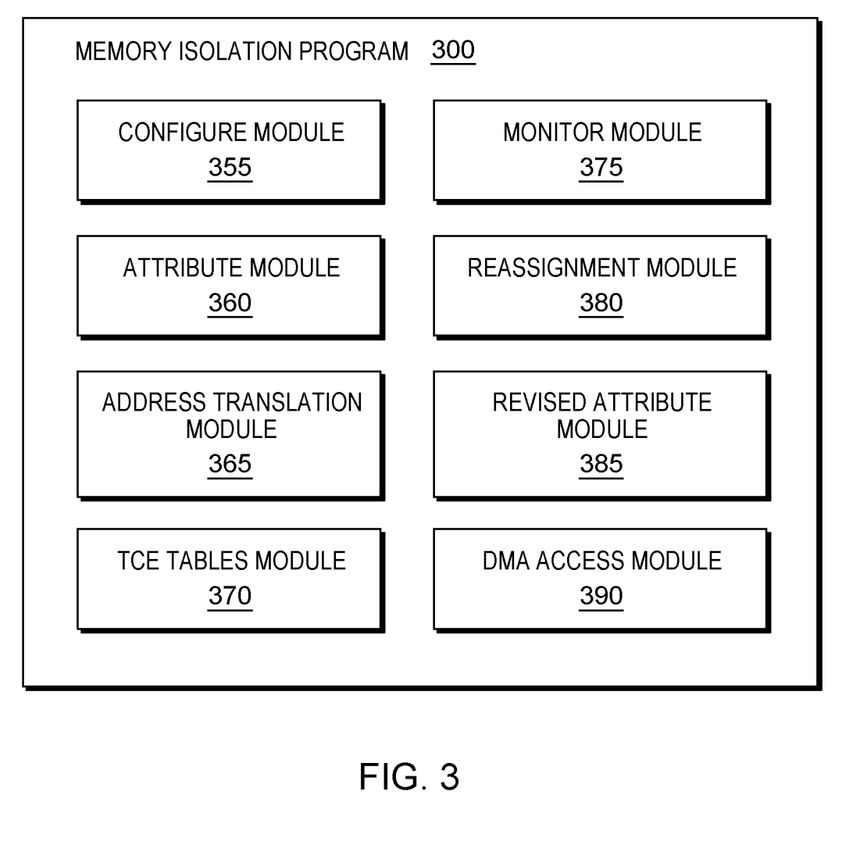
FIG. 3 is a schematic view of a machine logic (for example, software) portion of the first embodiment system.

Secure device program 300 operates to recognize I/O devices and their ownership for identifying secure memory access privileges. Secure I/O devices are provided access to isolated secure memory by controlled address translation processes and storage of TCE tables in secure memory. When assigned ownership changes secure memory access privileges, the corresponding I/O device is reinitialized, and the security attribute is revised for the I/O device.

There exist several security solutions under the Trusted Execution Environment (TEE) model that provide memory isolation between a secure computing entity (such as a secure virtual machine or a secure enclave) and non-secure computing entities sharing the same physical system.

Processor architectures often have at least two privilege levels. The privilege levels in the X86 instruction set architecture control the access of the program currently running on the processor to resources such as memory regions, I/O ports, and special instructions. In cases where there are four privilege levels, the levels often range from zero (0), which is the most privileged, to three (3), which is the least privileged. For systems with three states, many operating systems use privilege level zero for the kernel/executive and use privilege level two for application programs. If they allow virtualization, they use zero for the hypervisor, one for the OS, and two for the application programs. Some systems with four states use privilege level zero for a security monitor, such as an Ultravisor, and states one to three in a similar fashion to systems with three states. Some systems, such as X86, use the privileges in a different, but functionally equivalent way. (Note: the term(s) "Ultravisor" and/or "X86" may be subject to trademark rights in various jurisdictions throughout the world and are used here only in reference to the products or services properly denominated by the marks to the extent that such trademark rights may exist.)

According to some computer architectures, a protected execution Ultravisor, also referred to herein as an Ultravisor or, more generally, a security monitor, has a higher privilege level than a hypervisor. The Ultravisor is the security monitor for the system. Both the security monitor and the hypervisor have a superior privilege level to the operating system. The security monitor filters all calls, called hypervisor calls or hyper calls, between a secure virtual machine and the hypervisor to assure that only the information required to perform the call is passed to the hypervisor. The security monitor also filters all state changes caused by interrupts between a secure virtual machine and the hypervisor to protect the state of the secure virtual machine. The hardware prevents access by unauthorized system software and hardware to secure memory. In that way, the hypervisor and non-secure virtual machines are prevented from referencing secure memory.

Some embodiments of the present invention are directed to providing memory access isolation between multiple devices under a shared single I/O controller of a system where non-secure compute entities are communicating with some of the multiple devices while secure compute entities are communicating with others of the multiple devices.

When the hypervisor starts up a virtual machine, it passes metadata to the virtual machine that, among other things, tells the virtual machine all the devices that are assigned to the virtual machine and the metadata points to the BAR addresses and MMIO addresses. In that way, the virtual machine knows if it can communicate directly with a device (the device is physically attached to the virtual machine) or if it has to go through the hypervisor. It is very common to physically attach graphical processing units (GPU) and network adaptors to virtual machines. The principle reasons for attaching a device to a virtual machine is for efficiency or for confidentiality. When a virtual machine is assigned a device, or resource, the virtual machine is said herein to be the owner of the device or owning entity.

It should be noted that there are two independent considerations when dealing with securely attaching I/O devices to a TEE. Whether the device can be securely attached to a TEE and where the device should be securely attached to the TEE. Some embodiments of the present invention are directed to enabling secure attachment of an I/O device to a TEE. Determining whether the device in question should be attachable to the TEE is often performed by the owning entity when deciding whether or not to trust the attached device.

Figure 2:
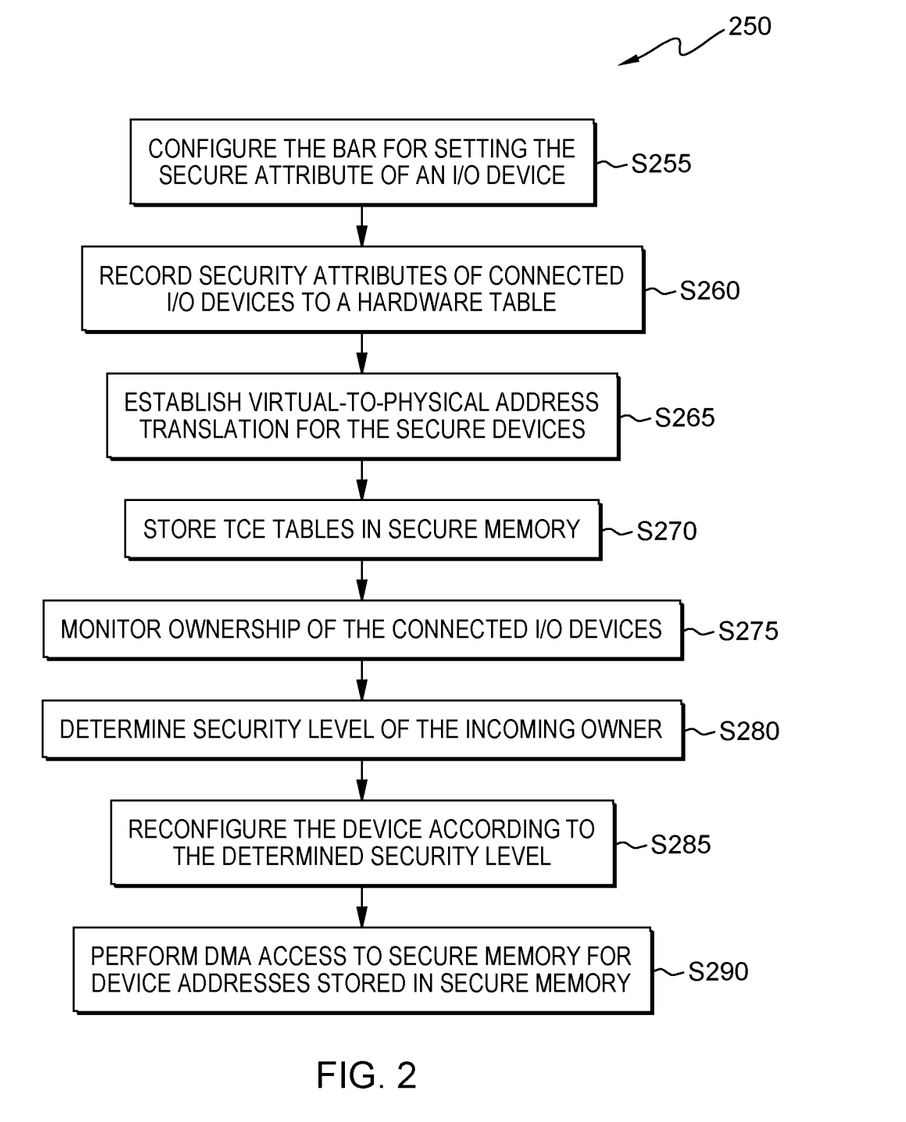
FIG. 2 is a flowchart showing a method performed, at least in part, by the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins with step S255, where configure module 355 configures the base address register (BAR) for setting the secure attribute of an I/O device. The transfer vector table (TVT) located in hardware, for example, in the secure device computer 200 (FIG. 1), is only accessible to the security monitor via a secure memory mapped I/O (MMIO) base address register (BAR) interface points to the base of the translation control entry (TCE) table. The BAR is configured to only allow a security monitor having privileges above the hypervisor (e.g. Ultravisor) to set the secure attribute indicator for partitionable endpoints (PEs) connected to the computing device.

Processing proceeds to step S260, where attribute module 360 records security attributes of the connected I/O devices to a hardware table. Each connected I/O device, also referred to as partitionable endpoint (PE), which is associated with the I/O device, is identifiable by a security attribute indicating whether or not the connected I/O device is permitted access to the secure memory associated with the TEE it is attached to. Mechanisms in the hardware provide for only the security monitor to access certain memory ranges. The hardware includes BARs that lie in those certain secure memory ranges. In that way, the MMIO BARs are only accessible by the security monitor. Within some of those MMIO BARs a hardware table is set up and edited for recording security attributes of the I/O devices.

Processing proceeds to step S265, where address translation module 365 establishes virtual-to-physical address translation with the I/O memory management unit (MMU) for the secure I/O devices. The secure I/O devices are the connected devices having a security attribute indicating access to the secure memory region is allowed. The address translation for secure memory locations is only available to secure I/O devices to facilitate use of a single I/O controller for both secure and non-secure I/O devices.

Processing proceeds to step S270, where TCE tables module 370, stores the TCE tables corresponding to secure I/O devices in secure memory. The security monitor sets up the TVT in such a way that the TCE base address of the non-secure endpoints must be in non-secure memory while the TCE base address of the secure endpoints must be in secure memory. Further, the physical memory associated with the BAR is mapped into the address space of the virtual machine owning the endpoint, or PE, associated with the I/O device. Storing the TCE tables for the secure I/O devices in secure memory further establishes isolation of the secure memory address from non-secure I/O devices.

Processing proceeds to step S275, where monitor module 375 monitors ownership of the connected I/O devices. Monitoring ownership allows for adjustment of the security attribute for the various I/O devices. When ownership reassignment is detected during monitoring, a determination is made as to whether or not the security attribute in the hardware table will change based on the security status of the incoming owner entity.

Processing proceeds to step S280, where reassignment module 380 determines a security level of the incoming owner of a first I/O device during ownership reassignment. In step S275, a first I/O device is determined to be reassigned to an incoming owner different than the outgoing owner. Reinitialization is performed on the first I/O device including a determination by the security monitor as to security level of the incoming owner. Endpoint, or device, ownership can transition in either direction from secure to non-secure or from non-secure to secure. Either transition causes the location of the TCE tables to change. If the incoming owner and outgoing owner are both secure, the TCE tables location does not change, but the device must be reinitialized and be mapped to the incoming owner.

Processing proceeds to step S285, where revised attribute module 385 reconfigures the first I/O device according to the security level of the incoming owner. Reconfiguration includes causing the device addresses to be stored in an appropriate memory space. That is, for a secure incoming owner, the device addresses are recorded to a TCE table in secure memory. Similarly, a non-secure incoming owner leads to the device addresses being recorded in a TCE table in non-secure memory, or normal memory. In that way, when the incoming owner does not have access to the secure memory region, the TCE table for the corresponding I/O device is not stored in secure memory. In this example, when an incoming owning entity and an outgoing owning entity are both non-secure entities, clearing the device state is optional. When the incoming and/or outgoing owning entity is a secure entity, the device state must be cleared.

Processing ends with step S290, where DMA access module 290 performs direct memory access (DMA) to secure memory for device addresses stored on TCE tables in secure memory. When a DMA access request directed to secure memory is received according to some embodiments of the present invention, translation of the device address to system address is performed on TCE tables in secure memory. When the device is a secure device attached to the TEE and the corresponding TCE table is located in secure memory, the security monitor has operated according to some embodiments of the present invention to assure access to secure memory is only permitted by secure owning entities.

Further embodiments of the present invention are discussed with reference to FIGS. 4 and 5 and in the other paragraphs that follow.

Some embodiments of the present invention are directed to security solutions under the trusted execution environment (TEE) model that provide memory isolation between a secure computing entity (such as a secure virtual machine or a secure enclave) and I/O devices being used by the secure computing entity where memory and control isolation is possible.

Some embodiments of the present invention take advantage of additional function support from the I/O controller including a hardware table that stores the security attribute of each partitionable endpoint (PE). This attribute is a single bit describing whether or not the PE has access to the secure memory region. In some embodiments, the hardware table can be simply implemented by adding an additional content addressable memory (CAM) array into the controller design. When a request is received from a PE the CAM array is looked up and the security attribute is determined for the requesting PE.

For example, as shown in Table 1, the PE designation 0xB has access to secure memory while other PEs of the system do not have access to the secure memory.

TABLE 1

Hardware Table Implementation.

| PE ID | S-bit Designation |
|---|---|
| 0 × A | 0 |
| 0 × B | 1 |
| . . . | 0 |
| . . . | 0 |
| 0 × N | 0 |

Some embodiments of the present invention take advantage of additional function support from the I/O controller including a configuration that ensures that the above-mentioned hardware table is only accessible from the security monitor state where at least two privilege levels are provided for in the processor architecture, the security monitor level being a higher privilege level than the privilege level of a typical hypervisor. Access from only the security monitor state can be ensured by mapping the control registers that allow access to the hardware table itself in secure memory such that only the security monitor can update the hardware table.

Some embodiments of the present invention take advantage of additional function support from the I/O controller including a configuration that the I/O controller will only allow secure memory access to the DMA requests arriving from a PE that is labeled secure such that an error is raised otherwise and no secure access is provided. Some embodiments of the present invention mask the final translated address with a secure bit that is populated or not populated depending on the secure attribute of the PE that is associated with access to the secure memory.

Some embodiments of the present invention take advantage of additional function support from the I/O controller including a condition that, during the translation of a device address to a system address, secure memory can only be referenced if the translation is for a secure PE, otherwise an error is raised and no secure access is provided. This secure access condition requires additional checks during page walk over translation control entry (TCE) tables during translation of a device address into system address.

With the above-mentioned I/O controller functionality, trusted firmware can configure the I/O controller such that the PE-attribute table is only editable by the security monitor. Then the security monitor can configure the PEs associated with a specified secure VM to have the secure attribute set while the other PEs do not have the secure attribute set. This allows the non-secure PEs to only be able to read and write non-secure memory while secure PEs are provided access to secure memory, while all of the PEs are controlled by the same I/O controller.

Figure 4:
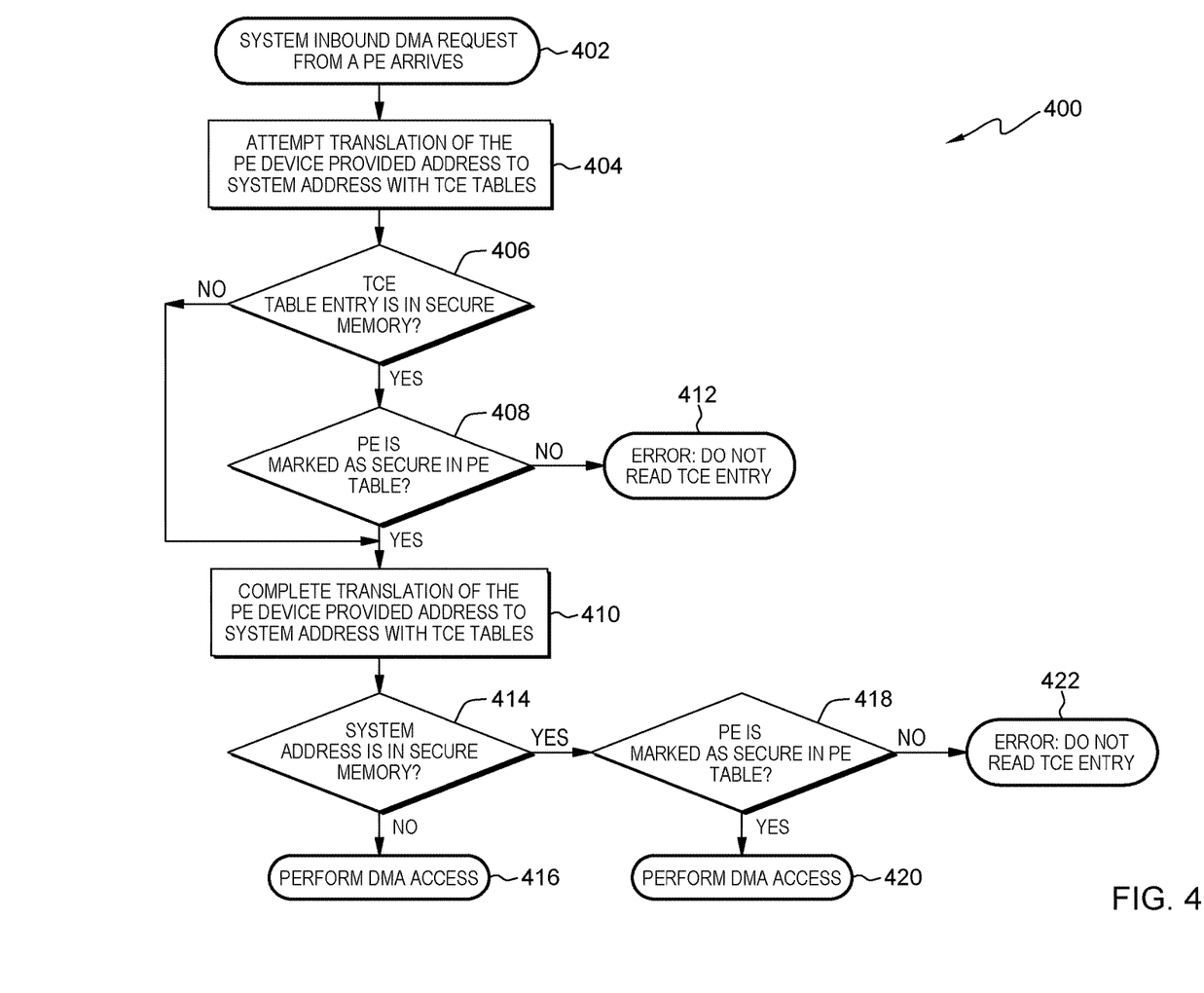
FIG. 4 is a flowchart view of a second embodiment of a method according to the present invention.

FIG. 4 shows flowchart 400 depicting a second method according to an embodiment of the present invention. This method and associated software will now be discussed, over the course of the following paragraphs, with extensive reference to FIG. 4 for the method step blocks. The described method may be implemented on any computing system providing for secure memory access for connected I/O devices such as computing sub-system 102 (FIG. 1). The method illustrated in FIG. 4 relies on the security monitor to place all TCEs associated with secure PEs in secure memory. This is part of what is done in the method illustrated in FIG. 5. In some alternative embodiments of the present invention, the hardware provides additional protection by not allowing secure PEs to utilize TCEs that are not in secure memory.

Processing begins at step 402, where a system inbound direct memory access (DMA) request from a partitionable endpoint (PE) device arrives.

Processing proceeds to step 404, where translation of the device-provided address to a system address is attempted. In this example, the I/O memory management unit (MMU) attempts to translate the address with available TCE (translation control entry) tables. Upon identifying a corresponding TCE table for the translation, processing advances to step 406.

Processing proceeds to decision step 406, where it is determined whether or not the corresponding TCE table is stored in secure memory. If the TCE table is stored in secure memory, processing proceeds to decision step 408. If the TCE table is not stored in secure memory, processing proceeds to step 410, where the translation of the device-provided address is performed to generate the system address.

Following the "YES" branch, processing proceeds to decision step 408, where it is determined whether or not the partitionable endpoint is marked as "secure" in a partitionable endpoint table. Partitionable endpoints connected to the computing device receiving the DMA request are recorded in the partitionable endpoint table along with an indicator as to ownership of the PE, particularly when the PE is owned by a secure entity. When a PE is owned by a secure entity, the partitionable endpoint table indicates that the PE is "secure." A decision that the PE advances processing to step 410. If the PE is not marked as "secure," processing follows the "NO" branch and ends at step 412, where an error code is returned indicating "do not read TCE entry" or otherwise causing a rejection of the DMA request received at step 402.

Following the "YES" branch from step 408 or following the "NO" branch of step 406, processing proceeds to step 410, where the translation of the device-provided address is completed to generate the system address according to the corresponding TCE table.

Processing proceeds to decision step 414, where the system determines whether or not the system address translated from the device-provided address represents a location in secure memory. If the system address does not represent a location in secure memory, then no further controls are necessary, so processing follows the "NO" branch and ends at step 416 where the DMA request is granted according to the request received at step 402. If the system address does represent a location in secure memory, processing follows the "YES" branch to step 418.

Following the "YES" branch, processing proceeds to decision step 418, where the system determines whether or not the PE is marked as "secure" in the partitionable endpoint table. As noted above, the PE is marked as "secure" when it is owned by a secure entity. If the PE is marked as "secure," processing follows the "YES" branch and ends at step 420 where DMA access is granted. Access is granted in this case because the system address is in secure memory and the PE is owned by a secure entity, therefore access is properly granted. If the PE from which the DMA request arrives is not marked as "secure" in the partitionable endpoint table, processing follows the "NO" branch and ends at step 422 where an error code is returned indicating "do not read TCE entry" or otherwise causing a rejection of the DMA request received at step 402. A request for DMA to an address in secure memory should not be granted to an non-secure requesting PE device, so the process leads to an error message and rejection of the requested access.

Figure 5:
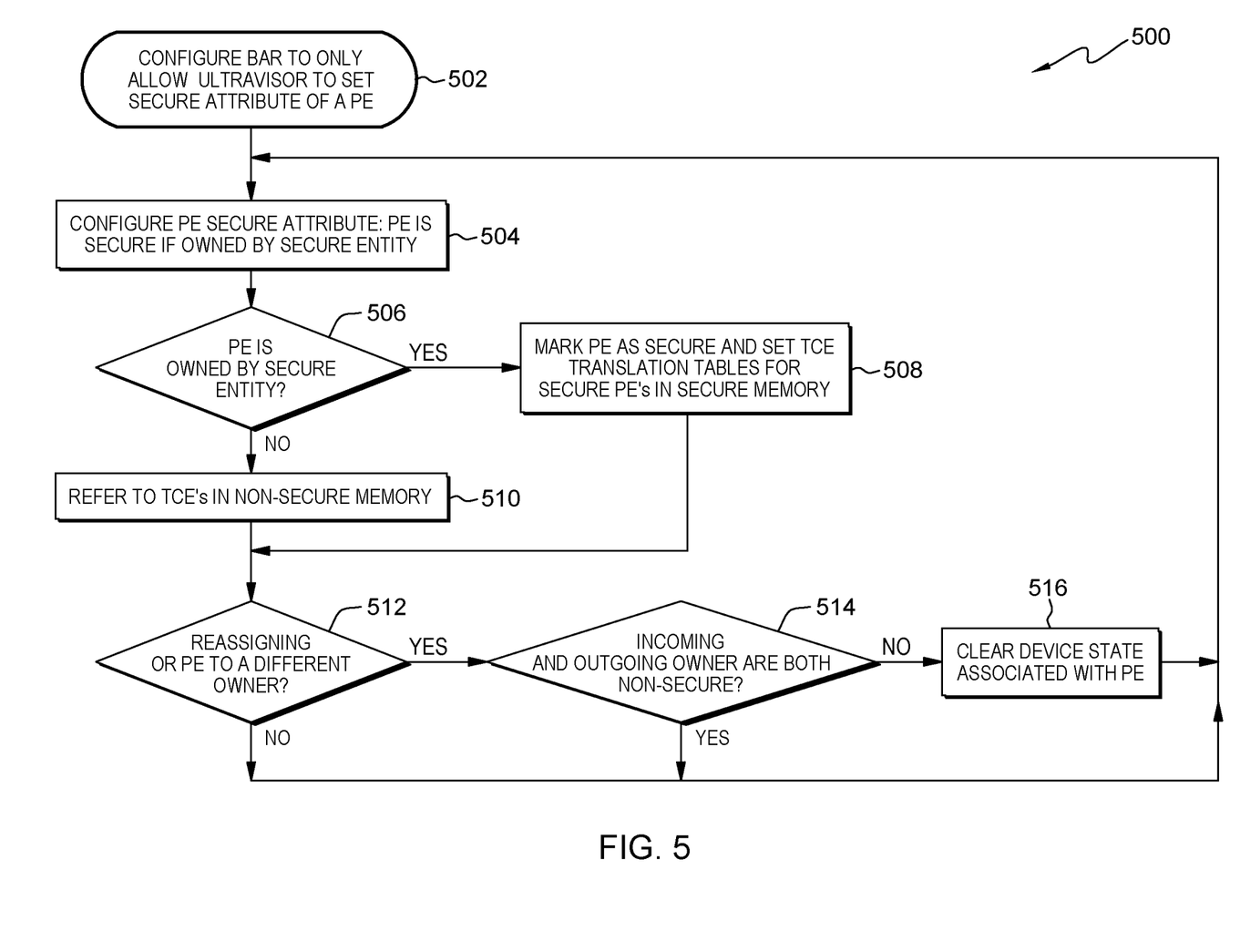
FIG. 5 is a flowchart view of a third embodiment of a method according to the present invention.

FIG. 5 shows flowchart 500 depicting a third method according to an embodiment of the present invention. This method and associated software will now be discussed, over the course of the following paragraphs, with extensive reference to FIG. 5 for the method step blocks. The described method may be implemented on any computing system providing for secure memory access for connected I/O devices such as computing sub-system 102 (FIG. 1).

Processing begins at step 502, where base address register (BAR) is configured to only allow security monitor having privileges above the hypervisor (e.g. Ultravisor) to set the secure attribute indicator for partitionable endpoints (PEs) connected to the computing device.

Processing proceeds to step 504, where each PE owned by a secure entity has a corresponding attribute set as "secure" in the attribute table. The attribute setting of secure indicates that direct memory access is permitted for secure memory areas. As discussed above, the attribute table may be a hardware table set up in the MMIO BAR configured to lie in secure memory ranges accessible only by the security monitor.

Processing proceeds to decision step 506 where it is determined whether or not a requesting PE is owned by a secure entity. Ownership of the PE may change over time. This decision step determines current ownership to make a DMA decision for a pending request for access. If the PE is not owned by a secure entity according to the secure attribute setting, processing follows the "NO" branch directly to step 510 where non-secure PEs are managed with translation control entries stored in non-secure memory. If the PE is owned by a secure entity according to the secure attribute setting, processing proceeds down the "YES" branch to step 508.

Following the "YES" branch, processing proceeds to step 508, where the security monitor marks the PE as secure and sets TCE translation tables for secure PEs in secure memory.

Processing proceeds to step 510 from step 506. In step 510, the hypervisor manages non-secure PEs as usual with reference to TCE translation tables in non-secure memory.

Processing proceeds to decision step 512 from either step 510 or from step 508 of the "YES" branch, where action is taken if there is a reassignment of ownership in a PE. For no reassignment, processing follows the "NO" branch, which returns the process to step 504. Where a reassignment is made, processing follows the "YES" branch to decision step 514. The decision made at step 514 is whether or not the incoming owner and the outgoing owner are both non-secure entities. If either one or both of the owners were secure entities, the decision is "NO" and the process follows the "NO" branch to step 516. If both owners are non-secure entities, the process follows the "YES" branch, which returns to step 504 for further monitoring/processing.

Following the "NO" branch, processing proceeds to step 516, where the device state associated with the PE is cleared. In this example, the security monitor clears the device state. When the device state is cleared, processing returns to step 504 for further processing of other PEs connected to the computing device that is receiving and/or processing the DMA requests from PEs.

Some embodiments of the present invention may include one, or more, of the following features, characteristics and/or advantages: (i) does not require the hypervisor to be part of trusted computing base (TCB); (ii) allows a security monitor (such as Ultravisor) to ensure the secure isolation guarantees while the hypervisor can continue to manage the non-secure devices; and/or (iii) allows for an I/O controller enforced separation scheme between secure and non-secure partitionable endpoints (PEs) as opposed to encryption-based isolation in solutions such as MKTME (multi-key total memory encryption).

Some embodiments of the present invention are directed to a process for tracking partitionable endpoints (PEs) for secure address translations to secure memory regions and managing reassignment of PE ownership with respect to secure entity and non-secure entity owners. The process includes: (i) Firmware must configure the controller Base Address Registers (BAR) such that editing the PE secure attribute table is only feasible from the security monitor; (ii) the security monitor must track which PEs are going to be used for secure computing entities such as secure VMs and mark them accordingly in the table; (iii) the security monitor will setup the I/O memory management unit (IOMMU) translation for the secure entities, with TCE tables for those entities also residing in secure memory (so that untrusted entities cannot change the translation to make secure I/O device read/write from a non-intended memory region); (iv) the hypervisor can now continue managing TCE tables for non-secure PEs without any risk of those PEs being able to access secure memory; and (v) if and/or when an I/O device is reassigned from ownership by a secure entity to ownership by a non-secure entity, from a secure entity to a different secure entity, or from a non-secure entity to a secure entity, the security monitor uses I/O device interfaces to reinitialize the I/O device in such a way that all of the previous state is cleared.

Some embodiments of the present invention are directed to a security monitor that tracks which PEs are going to be used for secure entities and sets up the IOMMU virtual-to-physical address translation for the secure entities so that when an I/O device is reassigned to or from secure entity ownership and non-secure entity ownership, the security monitor uses the device interfaces to reinitialize the I/O device such that all previous states are cleared. Further some embodiments of the present invention provide for the firmware to configure the controller Base Address Registers (BAR).

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for isolating secure memory from general access, the method comprising:
    using a single input/output (I/O) controller for both secure and non-secure I/O devices in a trusted execution environment (TEE);
    establishing address translation for a set of secure I/O devices and for a set of non-secure I/O devices at an I/O memory management unit, the address translation for the set of secure I/O devices only configured to access a secure memory portion of a secure endpoint computer within a TEE of a computing system, the address translation for the set of non-secure I/O devices configured to access a non-secure memory portion of the secure endpoint computer in the computing system, the address translation being facilitated by translation control entry tables, wherein the set of secure I/O devices and the set of non-secure I/O devices are concurrently connected to the computing system;
    recording security attributes of the set of secure I/O devices to a hardware table located in the secure memory portion, the security attributes indicating the set of secure I/O devices as having access to the secure memory portion within the TEE;
    storing the translation control entry tables for the set of secure I/O devices in the secure memory portion;
    receiving a direct memory access (DMA) request from a first I/O device;
    determining an entry in the translation control entry tables for a first address provided by the first I/O device is stored in the secure memory portion;
    identifying the first I/O device as a non-secure I/O device of the set of non-secure I/O devices based on the first I/O device not having a first security attribute indicative of a secure I/O device;
    translating the first address to a system address; and
    responsive to the system address residing in the secure memory portion and the first I/O device being a non-secure I/O device, returning an error message causing the entry not to be read.

2. The computer-implemented method of claim 1, further comprising:
    responsive to the system address residing in the secure memory portion and the first I/O device being marked secure in the hardware table, performing the requested DMA access.

3. The computer-implemented method of claim 1, further comprising:
    determining a security level of an incoming owning entity of a second I/O device, the second I/O device among the set of secure I/O devices during ownership reassignment; and
    reconfiguring the second I/O device according to the determined security level of the incoming owning entity.

4. The computer-implemented method of claim 3, further comprising:
monitoring ownership assignments of I/O devices connected to the I/O controller;
wherein:
determining the security level is performed responsive to detecting ownership reassignment of the second I/O device.

5. The computer-implemented method of claim 3, wherein reconfiguring the second I/O device includes:
revising a second security attribute of the second I/O device in the hardware table to reflect the security level of an incoming owning entity.

6. A computer program product comprising a computer-readable storage medium having a set of instructions stored therein which, when executed by a processor, causes the processor to isolate secure memory from general access by:
using a single input/output (I/O) controller for both secure and non-secure I/O devices in a trusted execution environment (TEE);
establishing address translation for a set of secure I/O devices and for a set of non-secure I/O devices at an I/O memory management unit, the address translation for the set of secure I/O devices only configured to access a secure memory portion of a secure endpoint computer within a TEE of a computing system, the address translation for the set of non-secure I/O devices configured to access a non-secure memory portion of the secure endpoint computer in the computing system, the address translation being facilitated by translation control entry tables, wherein the set of secure I/O devices and the set of non-secure I/O devices are concurrently connected to the computing system;
recording security attributes of the set of secure I/O devices to a hardware table located in the secure memory portion, the security attributes indicating the set of secure I/O devices as having access to the secure memory portion;
storing the translation control entry tables for the set of secure I/O devices in the secure memory portion;
receiving a direct memory access (DMA) request from a first I/O device;
determining an entry in the translation control entry tables for a first address provided by the first I/O device is stored in the secure memory portion;
identifying the first I/O device as a non-secure I/O device of the set of non-secure I/O devices based on the first I/O device not having a first security attribute indicative of a secure I/O device;
translating the first address to a system address; and
responsive to the system address residing in the secure memory portion and the first I/O device being a non-secure I/O device, returning an error message causing the entry not to be read.

7. The computer program product of claim 6, further causing the processor to perform a method including:
responsive to the system address residing in the secure memory portion and the first I/O device being marked secure in the hardware table, performing the requested DMA access.

8. The computer program product of claim 6, further causing the processor to perform a method including:
determining a security level of an incoming owning entity of a second I/O device, the second I/O device among the set of secure I/O devices during ownership reassignment; and
reconfiguring the second I/O device according to the determined security level of the incoming owning entity.

9. The computer program product of claim 8, further causing the processor to perform a method including:
monitoring ownership assignments of I/O devices connected to the I/O controller;
wherein:
determining the security level is performed responsive to detecting ownership reassignment of the second I/O device.

10. The computer program product of claim 8, wherein reconfiguring the second I/O device includes:
revising a second security attribute of the second I/O device in the hardware table to reflect the security level of the incoming owning entity.

11. A computer system for isolating secure memory from general access, the computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to perform a method including:
using a single input/output (I/O) controller for both secure and non-secure I/O devices in a trusted execution environment (TEE);
establishing address translation for a set of secure I/O devices and for a set of non-secure I/O devices at an I/O memory management unit, the address translation for the set of secure I/O devices only configured to access a secure memory portion of a secure endpoint computer within a TEE of a computing system, the address translation for the set of non-secure I/O devices configured to access a non-secure memory portion of the secure endpoint computer in the computing system, the address translation being facilitated by translation control entry tables, wherein the set of secure I/O devices and the set of non-secure I/O devices are concurrently connected to the computing system;
recording security attributes of the set of secure I/O devices to a hardware table located in the secure memory portion, the security attributes indicating the set of secure I/O devices as having access to the secure memory portion;
storing the translation control entry tables for the set of secure I/O devices in the secure memory portion;
receiving a direct memory access (DMA) request from a first I/O device;
determining an entry in the translation control entry tables for a first address provided by the first I/O device is stored in the secure memory portion;
identifying the first I/O device as a non-secure I/O device of the set of non-secure I/O devices based on the first I/O device not having a first security attribute indicative of a secure I/O device;
translating the first address to a system address; and
responsive to the system address residing in the secure memory portion and the first I/O device being a non-secure I/O device, returning an error message causing the entry not to be read.

12. The computer system of claim 11, further causing the processor to perform a method including:

responsive to the system address residing in the secure memory portion and the first I/O device being marked secure in the hardware table, performing the requested DMA access.

13. The computer system of claim 11, further causing the processor to perform a method including:
determining a security level of an incoming owning entity of a second I/O device, the second I/O device among the set of secure I/O devices during ownership reassignment; and
reconfiguring the second I/O device according to the determined security level of the incoming owning entity.

14. The computer system of claim 13, further causing the processor to perform a method including:
monitoring ownership assignments of I/O devices connected to the I/O controller;
wherein:
determining the security level is performed responsive to detecting ownership reassignment of the second I/O device.

15. The computer system of claim 13, wherein reconfiguring the second I/O device includes:
revising a second security attribute of the second I/O device in the hardware table to reflect the security level of the incoming owning entity.

16. A computer-implemented method comprising:
using a single input/output (I/O) controller for both secure and non-secure I/O devices in a trusted execution environment (TEE);
configuring a base address register such that only a security monitor has access for setting secure attributes in the base address register for partitionable endpoints connected to an input/output (I/O) controller;
recording to a hardware table, by the security monitor, a first security attribute of a set of secure partitionable endpoints connected to the I/O controller, the first security attribute indicating the set of secure partitionable endpoints are owned by entities configured to access a secure memory of a secure endpoint computer within a trusted execution environment (TEE) of a computing system, the hardware table being located in the secure memory;
recording to the hardware table, by the security monitor, a second security attribute of a set of non-secure partitionable endpoints connected to the I/O controller, the set of non-secure partitionable endpoints being owned by entities only configured to access a non-secure memory portion of the secure endpoint computer of the computing system, wherein the set of secure partitionable endpoints and the set of non-secure partitionable endpoints are concurrently connected to the computing system;
storing a first set of translation control tables in the secure memory of the secure endpoint computer, the first set of translation control tables maintaining addresses for the set of secure partitionable endpoints in the secure memory;
storing a second set of translation control tables in non-secure memory of the secure endpoint computer, the second set of translation control tables maintaining addresses for the set of non-secure partitionable endpoints in the non-secure memory;
receiving a direct memory access (DMA) request from a first non-secure partitionable endpoint;
determining an entry in the translation control entry tables for a first address provided by the first non-secure partitionable endpoint is stored in the secure memory of the secure endpoint computer;
identifying the first non-secure partitionable endpoint as owned by a first entity having only access to the non-secure memory of the secure endpoint computer based on the second security attribute recorded in the hardware table for the first non-secure partitionable endpoint;
translating the first address to a system address; and
responsive to the system address residing in the secure memory and the first non-secure partitionable endpoint being recorded with the second security attribute in the hardware table, returning an error message causing the entry not to be read.

17. The computer-implemented method of claim 16, further comprising:
establishing address translation for the set of secure partitionable endpoints at an I/O memory management unit for access to the secure memory.

18. The computer-implemented method of claim 16, further comprising:
determining a security level of an incoming owner of a first secure partitionable endpoint, the first secure partitionable endpoint among the set of secure partitionable endpoints during ownership reassignment; and
reconfiguring a first secure partitionable endpoint according to the determined security level.

19. The computer-implemented method of claim 18, further comprising:
monitoring ownership assignments of the partitionable endpoints connected to the I/O controller;
wherein:
determining the security level is performed responsive to detecting ownership reassignment of the first secure partitionable endpoint.

20. The computer-implemented method of claim 18, wherein reconfiguring the second partitionable endpoint includes:
revising a corresponding security attribute of the first secure partitionable endpoint in the hardware table to reflect the security level of an incoming owning entity.

* * * * *